United States Patent [19]

Martin et al.

[11] Patent Number: 4,477,942
[45] Date of Patent: Oct. 23, 1984

[54] POULTRY BREAST DE-BONING MACHINE AND PROCESSING METHOD

[75] Inventors: Eugene G. Martin, New Holland; Dale M. Risser, Denver, both of Pa.

[73] Assignee: Victor F. Weaver, Inc., New Holland, Pa.

[21] Appl. No.: 493,924

[22] Filed: May 12, 1983

[51] Int. Cl.³ .............................................. A22C 21/00
[52] U.S. Cl. ............................................ 17/11; 17/52
[58] Field of Search .......................... 17/11, 52, 16, 46

[56] References Cited

U.S. PATENT DOCUMENTS

| 3,237,664 | 3/1966 | Macy et al. | 17/52 |
| 3,639,945 | 2/1972 | Duncan | 17/52 |
| 3,943,600 | 3/1976 | Cramer | 17/52 |
| 4,407,046 | 10/1983 | Wright | 17/11 |
| 4,424,608 | 1/1984 | Martin | 17/52 |

Primary Examiner—Nicholas P. Godici
Assistant Examiner—Kurt Rowan
Attorney, Agent, or Firm—Samuel M. Learned, Jr.

[57] ABSTRACT

A poultry breast de-boning machine adapted to insertably receive and radially transport in securely supportable positioning retention respectively upon one of an arcuately spaced plurality of mechanically identical truncated conical mandrel stations thereof a succession of forward bilateral poultry carcass sections for subsequent concurrently accomplished sequentially combined step-wise manual and automated mechanical removal of breast fillets therefrom by a method embodying first a mechanical clamping of the respective wings in a carcass section torso-lateral distended disposition preparatory to completion of sequential manually incised cuts made to the respective wing-to-torso shoulder joint connecting points to thereby facilitate initiation and completion of automated mechanical wing-clamped downward pull-peel separation of the wings and interconnected breast fillets therewith in delivery from such carcass sections a separated and substantially bone-fragment free set of joined breast fillets with wings thereto attached, thereafter followed by a step-wise manually incised and pull-peel removal of a set of substantially bone-fragment free "tenders" from the remaining skeletal component comprised of a carcass section torso rib cage having interconnected backbone and breast keel contained therewith.

10 Claims, 8 Drawing Figures

POULTRY BREAST DE-BONING MACHINE AND PROCESSING METHOD

BACKGROUND OF THE INVENTION

The instant invention relates to a poultry breast de-boning machine and that processing method provided thereby for accomplishing a combined manual and automated mechanical removal of breast fillets from forward bilateral poultry carcass sections which have been previously separated from eviscerated whole poultry carcass members by other processing operation apparatus and technique, wherein it is first to be understood as herein described that the term "poultry" refers to edible fowl generally including but not necessarily limited to chickens, turkeys, geese, ducks, pheasants, squab, and the like, and second to be understood is the term "forward bilateral poultry carcass section" which refers to that portion of a poultry carcass consisting of both wings bilaterally attached to the torso and entire breast portion thereof including the skeletal structure of ribs and keel in supportive connection from the vertebra of the backbone at the torso back and at the torso bottom the soft so called "belly skin" in extendible connection of the breasts respectively to the thigh juncture locations at opposite sides of the torso.

Traditionally, in view of the relatively fragile bone structure of poultry, and the stringent requirements that either raw or precooked meat removed from the poultry carcass supportive skeletal structure be free of either scraped or broken bone fragment contamination, poultry carcass meat peeling and removal operations in accomplishing de-boning have been generally accomplished by a combination of manual and relatively simple manually operated mechanical means which, although slow, does provide a high degree of processing control over the poultry carcass section being worked upon and thereby substantially reduces a likelihood of there being bone fragment contamination in removed meat. Examples of prior art disclosures which teach the combined manual and manually operated means for removal of meat from skeletal structure would be as set forth in U.S. Pat. No. 3,192,557 to Segur, dated July 6, 1965, and U.S. Pat. No. 3,629,903 to Turner, dated Dec. 28, 1971, wherein both of the aforementioned disclosures teach static fixtures which are employed to facilitate the manual removal of meat. In a subsequent disclosure by Segur as taught in U.S. Pat. No. 3,348,261 dated Oct. 24, 1967, there is shown a manually operated mechanical means employed to plow the meat off a poultry leg after the meat thereon has been longitudinally slit to the bone along at least one side of the leg section.

With continually evolving development of convenience food items, such as fried fillet of chicken breast sandwiches and the like, the increase in acceptable poultry breast fillet product to meet that demand has far exceeded the current processing capacity and state of the art to economically produce substantially bone fragment free product at growing demand levels and increasing competitive margins. It is the instant invention apparatus and method provided thereby which orients on acceptably meeting the present and increasing de-boned poultry breast fillet product demand.

In accomplishment of poultry breast de-boning operations one of the main initial problems to be overcome is that of being able to properly secure and maintain a carcass section containing the whole breast in a steady disposition relative to the particular de-boning apparatus to be employed, and as shown in U.S. Pat. No. 3,531,825 dated Oct. 6, 1970, to Segur et al one method for accomplishing the holding of a whole eviscerated poultry carcass for performance of meat removal processing operations is by the body cavity posterior opening insertion of a shaped reciprocating tensioning element urged into the poultry carcass cavity to thereby secure the same during manual removal therefrom of raw meat by means of two hand-held power-operated knives. Poultry carcass internally inserted holding apparatus are also shown in respective keel bone removal teachings of Panek in U.S. Pat. No. 3,541,634 dated Nov. 24, 1970, and Colosky in his U.S. Pat. No. 3,665,553 dated May 30, 1972, all of which provide the advantage of enabling open and ready access to those carcass areas upon which processing operations are to be performed.

The combination of poultry carcass cavity internal holding and mechanical meat removal is shown in U.S. Pat. No. 3,570,050 to Draper et al dated Mar. 16, 1971, therein teaching both an apparatus and method for holding a whole eviscerated poultry carcass by body cavity posterior opening insertion of a supporting fixture comprised of parallel longitudinally extending vertically spaced and extensible clamp arms respectively adapted to conformably engage the upper and lower interior body cavity poultry carcass surfaces upon extension thereof to thereupon secure the carcass during performance of, among other processing operations, the removal of breast fillets by means of directed water jets in cutting a plane to intersect the keel bone at an acute angle respectively either side thereof.

Another apparatus and method for accomplishing breast de-boning is that machine marketed and sold by the RDM Corporation of Columbus, Ohio, designated as their Automatic Breast Deboner Model CFS B1, which is adapted to receive manually positioned whole breast sections upon chain conveyor transported saddles for subsequent progressive engagement by angled blades to thereby effect a plowable poultry breast fillet removal respectively from either side of the keel bone.

Other poultry cutting apparatus showing the employment of carcass section body cavity inserted holding mandrel means for positioning and securing the same in accomplishment of de-boning processing operations would include the respective teachings of Gasbarro in his U.S. Pat. No. 3,624,863 dated Dec. 7, 1971, and U.S. Pat. No. 4,067,085 dated Jan. 10, 1978.

It should be understood that some of the features of the instant invention have, in some respects, structural and functional similarities to certain of those teachings separately set forth in the prior art disclosures heretofore cited and briefly discussed. However, as will hereinafter be pointed out, the instant invention is distinguishable from said earlier teachings in one or more ways in that the present invention has utility features and new and useful advantages, applications, and improvements in the apparatus and method of accomplishing poultry breast de-boning processing operations not heretofore known.

SUMMARY OF THE INVENTION

It is the principal object of the present invention to provide a mechanically reliable and relatively simple high production output poultry breast de-boning machine and method for accomplishing the processing of forward bilateral poultry carcass sections in delivering as reduced components thereof a substantially bone-fragment free set of joined breast fillets with wings thereto attached, a separated set of bone-fragment free "tenders", and a separated skeletal component comprised of the torso rib cage with inter-connected back-bone and keel.

It is also an object of the present invention to provide a poultry breast de-boning machine equipped with trailing cam follower activation means for the mechanical meat stripping and skeletal component ejection functions thereby enhancing smoothness of mechanical functioning and substantially reducing if not eliminating operational mechanism rotational displacement binding problems over the processing speed range of said machine.

It is another object of the present invention to provide a poultry breast de-boning machine and method embodying the use of poultry torso section truncated cone support mandrels employed in a manner whereby an oriented positive torso cavity inserted placement of forward bilateral poultry carcass sections individually and sequentially thereon with concurrent torso transverse spaced mechanically cooperative clampable wing engagement thereof enables the secure maintenance of carcass section positioning control during and throughout the accomplishment of combined manual and mechanical de-boning processing operations employing the machine and method hereof.

It is still another object of the present invention to provide a machine configuration and de-boning method adapted to accomplish poultry breast de-boning operations by minimum actual cutting of forward bilateral poultry breast carcass section tissue in effecting the separation of component meat portions thereof from the torso rib cage skeletal support structure including both backbone and keel members retained therewith.

Yet another object of the present invention is to provide a machine and method cooperatively employing the optimum sequencing combination of both manual and mechanical de-boning operations to yield an overall de-boning method embodying respectively the most efficient, economical, and precise features of each.

Details of the foregoing objects and of the invention, as well as other objects thereof, are set forth hereinafter and are illustrated in the accompanying drawings comprising a part of the application.

DETAILED DESCRIPTION OF THE INVENTION

Figure 1:
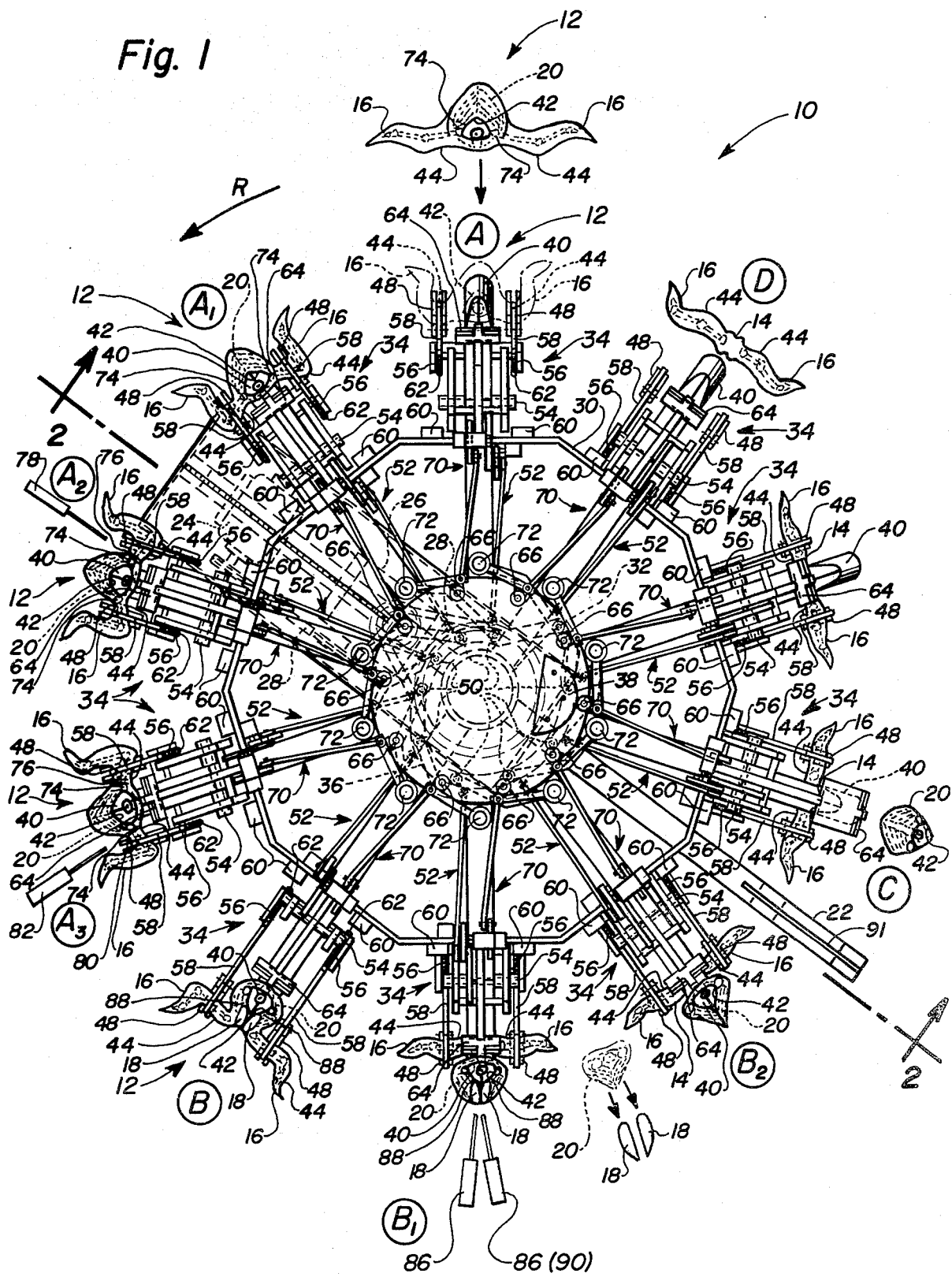
FIG. 1 is a top plan view of the poultry breast de-boning machine comprising the instant invention, the same being shown throughout the various processing station locations and positions thereof with an exemplary forward bilateral poultry carcass section sequentially undergoing various of the breast de-boning processing steps of that method accomplished thereby.

Referring to FIG. 1, the present invention is shown which comprises a poultry breast de-boning machine 10 illustrated in top plan view to better detail the structure thereof as well as also the sequential method provided thereby in processing a forward bilateral poultry carcass section 12 in arcuate displacement through a rotational machine cycle for completion of a concurrently accomplished step-wise procedure employing in combination both manual and mechanically automated de-boning stages to first deliver therefrom as separated components a substantially bone-fragment free set of joined breast fillets 14 with wings 16 thereto attached followed by a removal of a substantially bone-fragment free set of "tenders" 18 with the carcass section torso rib cage 20 containing therewith the backbone vertebra and breast keel remaining as the separated carcass section skeletal components, wherein the major mechanical sub-assemblies of said machine 10 whereby said method is accomplished include a supporting frame structure comprised of interconnected horizontally and vertically disposed members 22 and mounted thereon a drive motor 24 which is operable through a right angle gear box 26 connected by chain and sprocket drive 28 whereby rotary displacement motion is imparted to the mandrel station turntable assembly frame 30 by means of a vertically disposed intercommunicating main drive shaft 32 rotationally operational within the stationary cam mounting bearing cylinder 33 which in turn effects radially driven rotational displacement of a plurality of dual trailing cam follower operated mechanically identical equally arcuately spaced mandrel stations 34 operationally assembled upon said turntable assembly frame 30 and in turn upon which said forward bilateral poultry carcass sections 12 are manually positioned successively for subsequent arcuate displacement processing as concurrently and sequentially cycled respectively by stationary clamp cam 36 and stationary pivotal push plate cam 38 during progressive arcuate displacement rotational traverse of said turntable assembly frame 30.

Referring again to FIG. 1 to describe in greater detail the component parts of the structural sub-assemblies of this invention and the operational aspects thereof in accomplishing the processing method provided thereby, wherein it is to be understood that each of the plurality of mandrel stations 34 are both structurally and functionally identical one to the other so that the structural and operational sequence descriptions for one such mandrel station 34 through one complete processing arcuately displaced rotational cycle as hereinafter more fully recited applies equally to each of the remainder of such mandrel stations 34 comprising the plurality thereof in view of which understanding the following description will focus upon and detail the rotational cycle operational displacement and method of use of one such mandrel station 34 from forward bilateral carcass section 12 infeed through breast de-boning thereof and the "tender" removals therefrom to delivery.

The machine 10 operator post and loading position is in the immediate proximity of location "A" as shown in FIG. 1 which is a position that provides an operator with normal and immediate arm-reach access to the loading position of said machine 10 for accomplishing successive manually insertable placement respectively of forward bilateral poultry carcass sections 12 upon the truncated cone 40 of said mandrel stations 34 as the same are rotationally displaced sequentially past location "A". As shown in FIG. 1, and more clearly in greater detail respectively in subsequent FIGS. 5 and 6 hereof to be hereinafter discussed in detail, the forward bilateral poultry carcass section 12 being manually oriented with the neck opening 42 thereof upward facing and the upper wing members 44 thereof held in torso-outward distended disposition is manually infed to said machine 10 at location "A" by the operator positioning said carcass section 12 through the lower torso opening 46 thereof, as more specifically illustrated in FIGS. 6 and 8 hereof, downwardly so as to be insertably urged upon the truncated cone 40 of said mandrel station 34 in a manner to be wedgeably supportive thereof in upwardly internal carcass section torso cavity surface communication and simultaneous therewith manually effect clamping of the respective torso outwardly distended upper wing members 44 by directed insertion thereof into the spring biased upper wing member clamping jaws 48 to thereby be retained in the aforesaid torso-outward distended disposition and downward urged inserted positioning upon said truncated cone 40 as shown in phantom at location "A" of FIG. 1.

In the foregoing regard it will be noted with respect to said upper wing member clamping jaws 48 that the same are operable to either effect spring biased clamping of said upper wing members 44 or the release thereof by operation of clamp trailing cam follower 50 upon said stationary clamp cam 36 and operable through the clamp trailing cam follower pivotal linkage assembly 52 pivotally about clamp pivot pintle 54 to cycle said clamping jaws 48 fully upward for the receipt of carcass section 12 loading and upper wing member 44 engagement tensionably against spring biased force of the clamp compression springs 56 as at the machine operator post and loading position "A", or cycle pivotally outward and downward with reference to the vertically disposed main drive shaft 32 and in the process further urge said carcass section 12 downwardly upon said truncated cone 40 while simultaneously engagably retaining said upper wing members 44 and thereby effecting peelable stripping of the joined breast fillets 14 with wings 16 thereto attached by the method hereof as at machine position "B" or clamp cam 36 cycled in a fully downward configuration so that the cooperative clamp compression spring plunger shafts 58 are caused to compressively contact the clamp compression spring plunger shaft stop lug 60 by communication therewith of the clamp compression spring plunger shaft caps 62 thereby effecting compressive deflection of said clamp compression springs 56 and thereby in turn effecting pivotal opening of said clamping jaw 48 to release the upper wing members 44 with joined breast fillets 14 thereto attached as at machine position "D".

Figure 2:
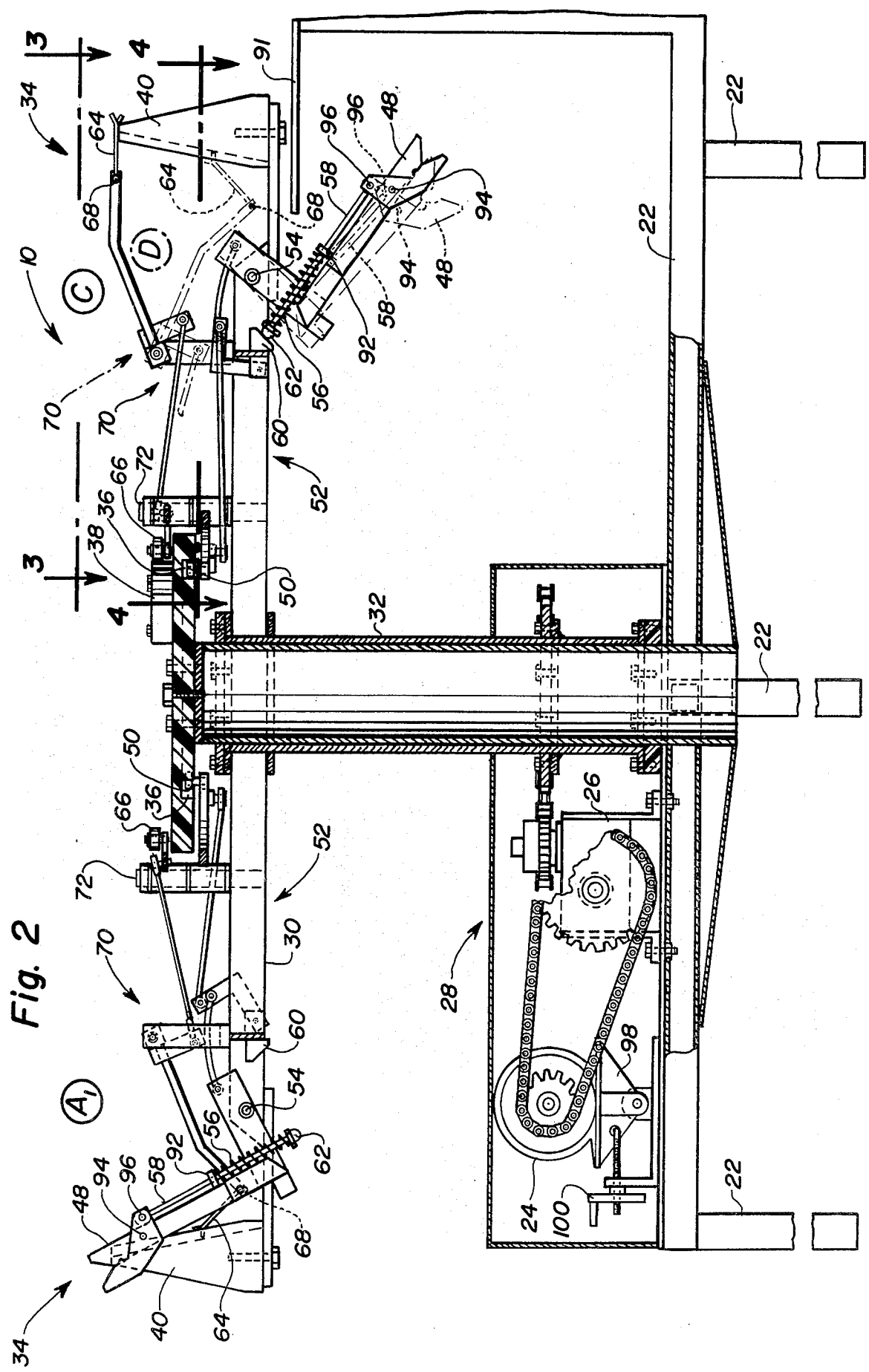
FIG. 2 is an enlarged side sectional elevation of the de-boning machine shown in FIG. 1 generally as seen along the line 2—2 thereof, with, however, the exemplary forward bilateral poultry carcass section not being therein illustrated to thereby more clearly show by means of phantom illustration mechanical functioning respectively of the processing infeed and delivery station operational components thereof.

The configuration of the carcass section torso rib cage ejection pivotal push plate 64 at machine position "A" is in the downward flexed retracted configuration as is more clearly shown in FIG. 2, wherein said torso rib cage ejection pivotal push plate 64 is operable through tracking of the pivotal push plate trailing cam follower 66 upon the stationary pivotal push plate cam 38 pivotally about push plate ejection pivot pintle 68 all connectably translatable through the pivotal push plate trailing cam follower pivotal linkage assembly 70 to cycle pivotally and pushably upward to effect carcass section torso rib cage ejection at machine position "C". Thus, at machine 10 position "A", the mandrel stations 34 as respectively radially displaced counterclockwise thereby at a constant run speed set, as indicated by arrow "R", are sequentially presented in cam cycled disposition for accomplishing manual infeed loading by the machine operator of a continual succession of forward bilateral poultry carcass sections 12.

It will be noted that as to the trailing cam followers, 50 for the clamps and 66 for the pivotal push plates, for any particular mandrel station 34, both such trailing cam followers operate off a common cam follower pivot shaft 72 which with respect to any particular such mandrel station 34 is positioned at that mandrel station arcuately removed one direction of rotation station location forward thereof. The purpose for using the trailing cam follower structure is to substantially eliminate mechanical binding problems otherwise associated with direct cam follower linkages.

In arcuately traversing from position "A" through position "A₃" as shown in FIG. 1, the mandrel station 34 cam-driven component assembly mechanical dispositions, that is, those of the upper wing member clamping jaws 48 and of the carcass section torso rib cage ejection pivotal push plate 64 and the respective linkage assemblies 53 and 70 thereof, remain in initial configurations as respectively described therefor at machine position "A". It is during arcuate traversement of a loaded forward bilateral poultry carcass section 12 from machine position "A" to position "A₃", however, that the following concurrently accomplished manually combined processing steps of the poultry breast de-boning method hereof are accomplished, being as follows. First, position "A₁" provides no processing function per se except to serve as a clearing position from "A" and as a transitory staging position during constant run speed arcuate displacement infeed of the loaded mandrel station 34 into position "A₂".

With the forward bilateral poultry carcass section 12 impaledly secured in downwardly held torso cavity 46 conformation upon the mandrel station 34 truncated cone 40 by means of the spring biased upper wing member clamping jaws 48 in distended engagement of the respective poultry carcass section upper wing members 44, the carcass section 12 is thereby effectively immobilized with respect to downward acting processing procedures which tend, if anything, by the method hereof to more securely conform the interior contact surfaces of the torso cavity of said carcass section 12 upon the tapered wedge surfaces of said mandrel station 34 truncated cone 40, and the respective upper wing-to-torso ball-and-socket shoulder joints 74 of said forward bilateral poultry carcass section 12 are dislocated and maintained in a dislocated disposition as a consequence of being retained in a pivotally outward and inclined tensioned torso-lateral distended disposition by said upper wing member clamping jaws 48 thereby presenting a spaced tendon and tissue juncture only for effecting a downward manually incised severable knife blade separation of the ball-and-socket members thereof.

At position "$A_2$" the first shoulder juncture tendon and tissue manual severing cut 76 is accomplished by a first processing assistant employing a first hand-held knife means 78 and at position "$A_3$" the second shoulder juncture tendon and tissue mandrel severing cut 80 is likewise manually accomplished by a second processing assistant employing for that purpose a second hand-held knife means 82. In the foregoing processing steps of accomplishing separation of the shoulder joint ball-and-socket junctures 74 by manually incised severable knife blade cutting of the tendon and tissue connecting membranes therebetween it is to be noted that the secure mechanical holding of the forward bilateral poultry carcass section 12 combined with the measured manual accuracy of executing the incising shoulder joint cuts during arcuate displacement of the subject poultry carcass section 12 at machine speed incorporates and embodies the best features of both mechanical and manual processing operation technique to yield an optimum processing method, wherein the foregoing sequential but concurrently accomplished steps in going from position "A" through position "$A_3$" prepatory to in turn accomplishing a substantially bone fragment free removal of joined breast fillets 14 with wings 16 thereto attached are exemplary thereof.

Up to and through arcuate transit of a poultry section loaded mandrel station 34, in displacement as above described in going from the machine operator post and loading position "A" just past the second shoulder juncture tendon and tissue manual severing cut position "$A_3$", the clamp trailing cam follower pivotal linkage assembly 52 has been per se neutral in terms of any mechanical cycling thereof in order to provide no other processing function than that of secure holding of the forward bilateral poultry carcass section 12 upon the mandrel station truncated cone 40. It continued arcuate displacement of the subject mandrel station 34 from said position "$A_3$" to the breast fillet peelable stripping position "B", however, the profile of the stationary clamp cam 36 progressively changes as shown in FIG. 1, and the subject mandrel station 34 clamp trailing cam follower 50 acts to effect an outward extension of the clamp trailing cam follower pivotal linkage assembly 52 which thereupon translates mechanically to arcuate downward cycling about clamp pivot pintle 54 of the spring biased upper wing member clamping jaws 48 which under maintained force of the clamp compression springs 56 retain holding of the poultry carcass section upper wing members 44 in accomplishing a two-fold automated mechanical processing step. First, the upper wing members 44, respectively free to both pivotally and arcuately displace downward as a result of previously executed first and second shoulder juncture tendon and tissue manual severing cuts 76 and 80, in fact do pivotally and arcuately displace downward simultaneously with cycling of the upper wing member clamping jaws 48 as aforesaid and in so doing thereupon more closely and intimately effect insertable secured retention contact of the interior torso rib cage cavity surfaces 84 of said carcass section, not illustrated in FIG. 1 but shown in FIGS. 6 and 8 respectively, upon the mandrel station truncated cone 40 and thereby in turn effect a more secure processing position retention of the subject forward bilateral poultry carcass section 12 as the breast de-boning operations thereon continue. Second, as a consequence of the downward pivotal and arcuate simultaneous displacement of the retained poultry carcass section upper wing members 44 with that of the cycling of the upper wing member clamping jaws 48, against the mandrel station truncated cone 40 body cavity impaled carcass section 12, the joined breast fillets 24 thereof with wings 16 thereto attached are peeled from the carcass section torso rib cage 20 which machine 10 cam cycled automated mechanical removal progressively continues during arcuate displacement transit of said mandrel station 34 through the breast fillet peelable stripping position "B" to the "tender" manual severing and removal position "$B_1$". At position "$B_1$" it will be noted that first the joined breast fillets 14 with wings 16 thereto attached are completely removed from the carcass section torso rib cage 20 thereby openly exposing the "tenders" 18 for facilitated removal, and second that the clamp compression spring plunger shaft caps 62 of the clamp compression spring plunger shafts 58 have been cycled by the clamp cam 36 through pivotal linkage assembly 52 to just "kiss" but not compressively engage the clamp compression spring plunger shaft stop lugs 60 such that said clamping jaws 48 maintain compressive spring biased retention force by means of said clamp compression springs 56 upon the poultry carcass section upper wing members 44.

Removal of the "tenders" 18, which are those choice loins of meat disposed within the poultry carcass station back along either side of the vertebra thereof and remain with the carcass section torso rib cage 20 upon removal of the joined breast fillets 14 with wings 16 thereto attached by the method hereof in employment of said poultry breast de-boning machine 10, is manually accomplished by a third processing assistant employing a third hand-held knife means 86 by the following procedure during continued arcuate transit of the subject mandrel station 34 from the tender manual severing cut and removal machine position "$B_1$" through the de-boning operation completion machine position "$B_2$".

Very simply, the third hand-held knife means 86, as illustrated at the tender manual severing cut and removal machine position "$B_1$", is employed by a third processing assistant to accurately engage and sever tender-to-carcass section back connecting tissue 88 so that thereafter during continuing arcuate displacement transit of the subject mandrel station 34 between machine position "$B_1$" to the "$B_2$" de-boning operation completion machine position the third processing assistant grasps and manually pull-removes the tenders 18 therefrom so that which remains in retained position upon the mandrel station truncated cone 40 is the carcass section torso rib cage 20, and the poultry breast de-boning process by that method hereof is per se completed upon arcuate displacement transit of said mandrel station 34 through machine position "$B_2$".

It should be noted at this point that in the alternate a third and fourth processing assistant may be employed in combination for accomplishing tender 18 removal as generally above-described during arcuate displacement transit of said mandrel station 34 between machine positions "$B_1$" through "$B_2$", by either one of the following additional operational techniques, the alternate employment of which is primarily dependent upon processing assistant manual dexterity and machine 10 set run speed. In the first alternative, the third processing assistant may sever with the third hand-held knife means 86 the first tender 18 to be removed and thereafter manually grasp and remove the same, and a fourth processing assistant alternately employing a fourth hand-held knife means 90 may sever the second tender 18 and likewise thereafter in a similar manner manually grasp and remove the same. In the second alternative, the third processing assistant employing said third hand-held knife means executes both tender 18 severing cuts as originally described, but then a fourth processing assistant accomplishes a simultaneous two-handed manual grasping and removal of said tenders 18.

As the mandrel station 34 continues arcuate displacement transit towards the carcass section torso rib cage ejection position "C", past the wiping bar 91 which engages and clears any residual torso rib cage to breast fillet tissue, the pivotal push plate trailing cam follower 66 tracking now an altered trace by engagement thereof with the stationary pivotal push plate cam 38 profile at that point is abruptly urged outward thereby cycling the pivotal push plate trailing cam follower pivotal linkage assembly 70 arcuately upward about the push plate ejection pivot pintle 68 in turn thereby urging the carcass section torso rib cage ejection pivotal push plate 64 upwards to engage the carcass section torso rib cage 20 and thereupon upwardly urge the same off the mandrel station truncated cone 40 in ejectment thereof thereby clearing said cone 40 for re-cycled manual placement positioning of another forward bilateral poultry carcass section 12 thereon at the machine operator post and loading position "A" for continued poultry carcass section breast de-boning operations as previously described.

Following the aforedescribed automated mechanical ejection of the carcass section torso rib cage 20, the continued stationary pivotal push plate cam 38 profile tracking by the pivotal push plate trailing cam follower 66 retractably recycles the pivotal push plate trailing cam follower pivotal linkage assembly 70 about the push plate ejection pivot pintle 68 arcuately downward to clear the truncated cone 40 of the subject mandrel station 34 for carcass section 12 reloading thereof, and thereafter in continued arcuate displacement transit of said mandrel station 34 the altered stationary clamp cam 36 profile tracked by the clamp trailing cam follower 50 first cycles the clamp trailing cam follower pivotal linkage assembly 52 extendably outward pivotally about the clamp pivot pintle 54 to thereby deflectively move the clamp compression spring plunger shaft caps 62 of the respective cooperative clamp compression spring plunger shafts 58 from the clamp compression spring plunger shaft stop lug 60 "kiss" positions as previously described to a firm contact compression position therewith to thereby effect co-active simultaneous compressive deflection of the clamp compression springs 56 and thereupon pivotally effect openings of the spring biased upper wing member clamping jaws 48 to in turn effect discharge of the joined breast fillets 14 with wings 16 thereto attached at the joined breast fillet with attached wing release position "D". At this point of arcuate displacement transit of said subject mandrel 65 station 34 the same is completely cleared of processed carcass section parts, and in completing arcuate transit return to machine operator post and loading position "A" the upper wing member clamping jaws 48 are recycled to an upward erected spring-biased upper wing member engagement loading configuration through continued tracking of the clamp cam 36 configured profile by the clamp trailing cam follower 50 whereby the clamp trailing cam follower pivotal linkage assembly 52 is retracted thereby causing the spring biased upper wing member clamping jaws 48 to rotate pivotally upward about clamp pivot pintle 54 and at the same time release the deflective force upon the clamp compression springs 56 thereby in turn enabling the same to extendably deflect and effect spring biased force upon said upper wing member clamping jaws 48 for effecting infeed reloading thereof at position "A", whereupon the concurrently accomplished step-wise sequential employment of said machine 10 in accomplishing forward bilateral carcass section breast de-boning operations by the method as heretofor described in detail is completed.

Preferably machine 10, as herein disclosed and described with reference to FIG. 1, is constructed of stainless steel and plastics for ease of cleaning and corrosion resistance, however, any other suitable materials or combinations thereof may be used.

Referring to FIG. 2, which is an enlarged side sectional elevation of the de-boning machine 10 of instant invention generally as seen along the line 2—2 of FIG. 1, absent, however, the illustration of exemplary forward bilateral poultry carcass section members for purposes of more clearly showing certain of the structural elements comprising the mandrel stations 34 and the respective trailing cam follower pivotal linkage assemblies 52 and 70 therefor, and the corresponding operational cycle configurations thereof in both load and discharge cycle modes of the spring biased upper wing member clamping jaws 48 and the carcass section torso rib cage ejection pivotal push plate 64. As shown, the stationary clamp cam 36 is an enclosed channel cam being lowermost of the two cam means provided whereby the mechanical de-boning processing operation cycling of said machine 10 mandrel stations 34 is effected, and although the cam face profile thereof is not per se illustrated in FIG. 2 the same as tracked by the clamp trailing cam follower 50 serves to cause extension and retraction of the clamp trailing cam follower pivotal linkage assembly 52 in pivotal cycle about the clamp pivot pintle 54 and thereby arcuately move the upper wing member clamping jaws 48 from the upper load configuration as illustrated in solid line drawing at machine position "A$_1$" of FIG. 2 through the breast fillet peelable stripping operation as previously described to the joined breast fillet with attached wing release position as illustrated in phantom lone drawing at arcuate displacement machine position "D" of FIG. 2 being just prior to a full processing operational rotation cycle return of mandrel station 34 to the machine 10 operator post and loading position "A" thereof. It should be noted that in the machine position "A$_1$" illustration of the upper wing member clamping jaws 48 as shown in FIG. 2, in the upper load configuration thereof the clamp compression springs 56 are fully extended between the adjustable spring stop 92 and the clamp compression spring plunger shaft caps 62 to thereby spring bias the cooperative clamp compression spring plunger shafts 58 fully rearmost to thereby in turn effect spring biased pivotal closing of said upper wing member clamping jaws 48 respectively about jaw pivot pintles 94 as translated co-pivotally through plunger shaft pintles 96. It should further be noted in the phantom illustration of the clamping jaw 48 as shown in FIG. 2 at arcuate displacement machine position "D", being just prior to a continued arcuate displacement re-entering of position "A", the clamp compression spring plunger shaft caps 62 of the cooperative clamp compression spring plunger shafts 58 are shown in compressive engagement of the clamp compression spring plunger shaft stop lug 60 thereby deflecting the clamp compression springs 56 and extending the clamp compression spring plunger shafts 58 translating co-pivotally through plunger shaft pintles 96 to effect respective openings of the clamping jaws 48 pivotally about jaw pivot pintles 94.

Also to be noted at position "$A_1$" of FIG. 2, the carcass section torso rib cage ejection pivotal push plate 64, cycled by the pivotal push plate trailing cam follower 66 through the pivotal push plate trailing cam follower pivotal linkage assembly 70, is disposed in the depressed carcass section load configuration. The remainder of FIG. 2 shows the cam cycled disposition of the carcass section torso rib cage ejection pivotal push plate 64 following arcuate displacement transport of the subject mandrel station 34 from de-boning operation completion through the carcass section torso rib cage ejection position "C", and as illustrated tracking of the stationary pivotal push plate cam 38 profile by the pivotal push plate trailing cam follower 66 which operates to extend the pivotal push plate trailing cam follower pivotal linkage assembly 70 which motion is thereupon translated through the push plate ejection pivot pintle 68 and thereby move the carcass section torso rib cage ejection pivotal push plate 64 from the depressed carcass section load position as shown in phantom line illustration to the elevated carcass section torso rib cage ejection position as shown in solid line illustration. It is to be noted that in continued station 34 arcuate displacement transport from machine position "C" to machine position "D", the carcass section torso rib cage ejection pivotal push plate 64 is re-disposed from the upward flexed ejection configuration to the depressed carcass section load configuration as shown in FIG. 2.

Additionally shown in greater detail in FIG. 2 is the machine 10 supporting frame structure 22 as well as the chain and sprocket drive 28 hook-up from drive motor 24 through right angle gear box 26 and the pivotal motor mount 98 with sprocket chain tension adjustment means 100 therefor.

Figure 3:
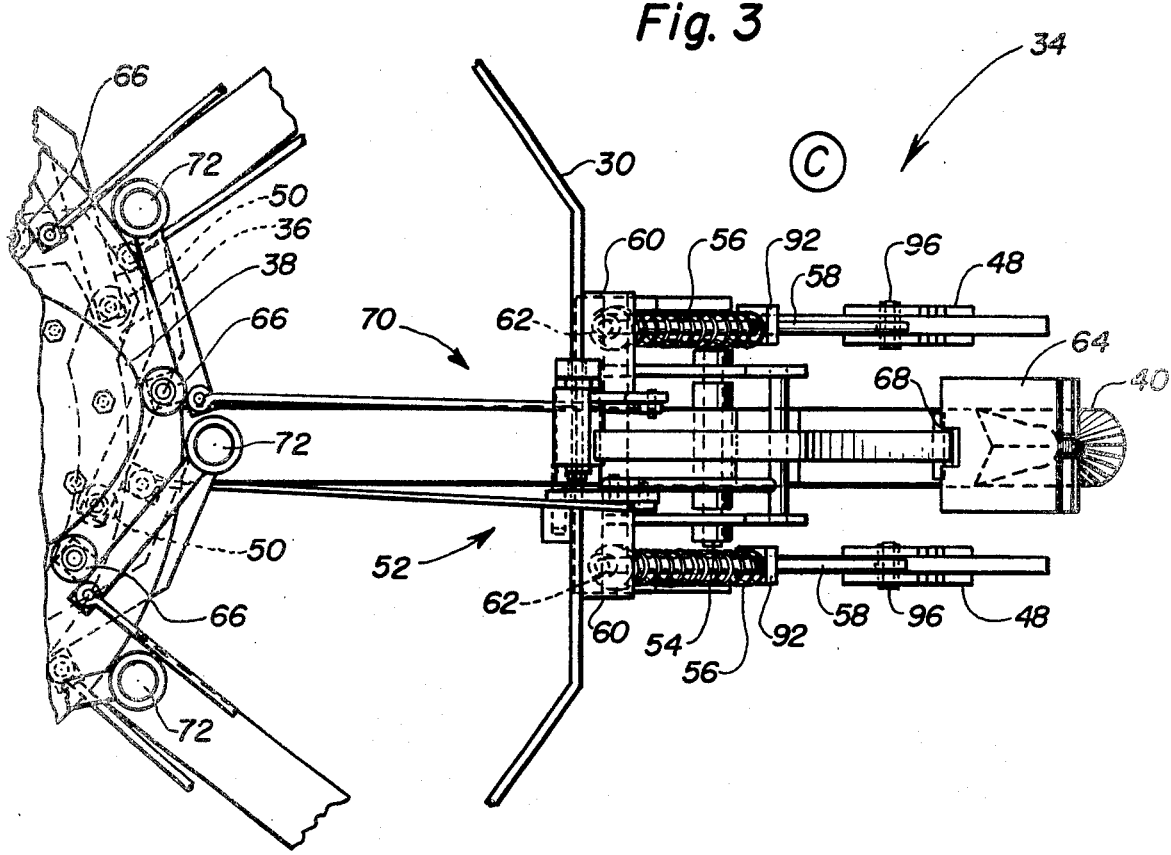
FIG. 3 is an enlarged top plan view of the delivery operational station as seen along the line 3—3 of FIG. 2 showing detail of the pivotal push plate cam follower pivotal linkage assembly and trailing cam follower assembly therefor.
Figure 4:
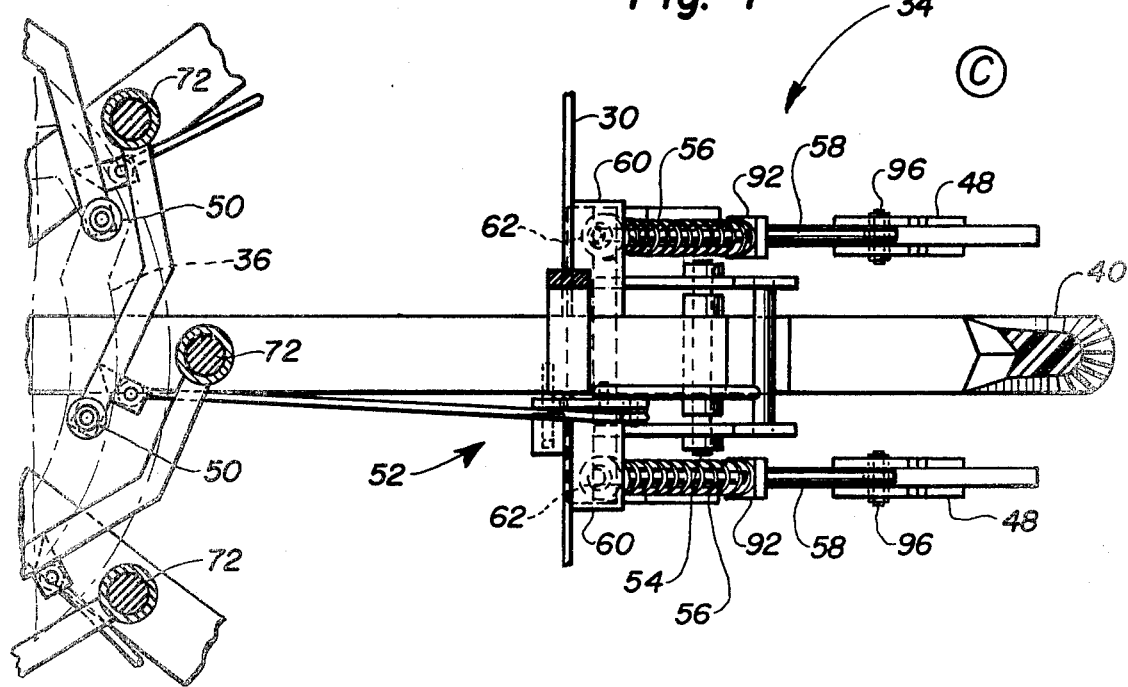
FIG. 4 is an enlarged top plan view of the delivery operational station as seen along the line 4—4 of FIG. 2 showing detail of the clamp cam follower pivotal linkage assembly and the trailing cam follower assembly therefor.

Considering now concurrently the respective enlarged top plan views shown in FIGS. 3 and 4 as seen along the respective section lines corresponding thereto in FIG. 2, wherein particular FIG. 3 illustrates in greater detail the pivotal push plate trailing cam follower pivotal linkage assembly 70 and the intercommunicating pivotal connections thereof in transmitting operational motions from the pivotal push plate trailing cam follower 66 therethrough to the carcass section torso rib cage ejection pivotal push plate 64. The FIG. 4 illustration shows corresponding greater detail of the clamp trailing cam follower pivotal linkage assembly 52 and the intercommunicating pivotal connections thereof in turn transmitting operational motions from the clamp trailing cam follower 50 therethrough to the spring biased upper wing member clamping jaws 48. It should be noted with respect to the foregoing that the FIG. 3 illustration shows the carcass section torso rib cage ejection pivotal push plate 64 at the machine "C" location and carcass section torso rib cage ejection configuration, and the FIG. 4 illustration, likewise shown at the machine "C" position location, depicts the spring biased upper wing member clamping jaws 48 in the down-cycled configuration as the same would appear just after peelable breast stripping but just before compressable engagement of the clamp compression spring plunger shaft caps 62 with the clamp compression spring plunger shaft stop lugs 60 to effect compressive deflection of the clamp compression springs 56 thereby opening the clamping jaws 48 to release the joined breast fillets 14 with wings 16 thereto attached.

Figure 5:
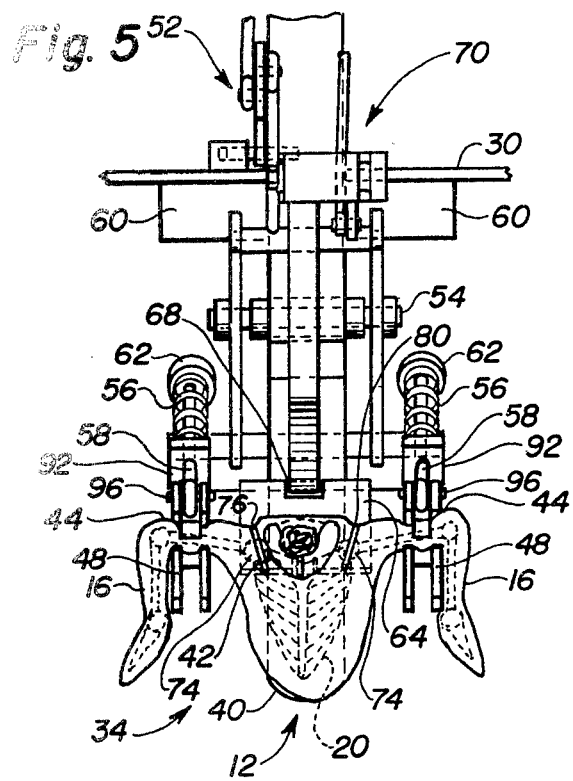
FIG. 5 is an enlarged top plan view of that de-boning machine post infeed processing intermediate station just prior to mechanical removal from the forward bilateral poultry carcass section of the joined breasts with wings thereto attached.
Figure 6:
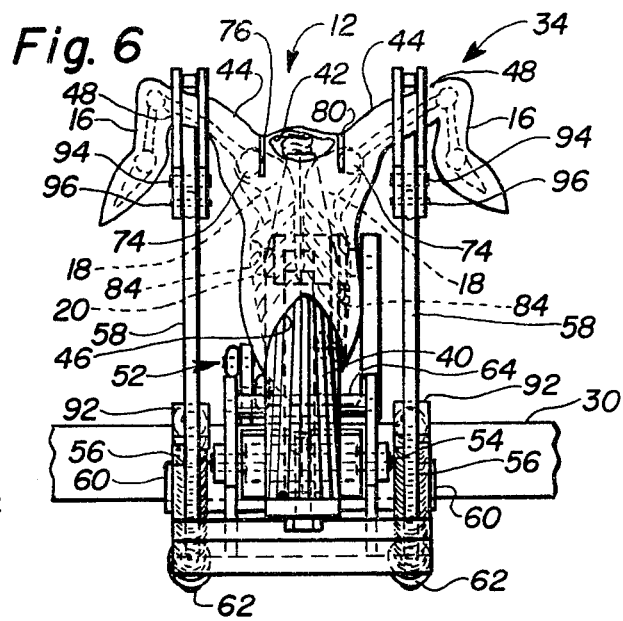
FIG. 6 is a front elevation view corresponding to that as illustrated in FIG. 5.

Turning now to a concurrent consideration of the illustrations shown in FIGS. 5 and 6 being respectively an enlarged top plan view and corresponding front elevation view of a carcass section loaded mandrel station 34 as the same would typically be seen at machine position locations "A" through "$A_3$", that is, from infeed manual placement of a forward bilateral poultry carcass section 12 upon the truncated cone 40 of a mandrel station 34 through the completion of manual wing-to-torso ball-and-socket joint severing operations. Particularly to be observed in the subject Figures of instant consideration is the manner of positioning placement and holding of a forward bilateral poultry carcass section 12 upon the mandrel station truncated cone 40 and the conformable urging thereupon of the interior torso rib cage cavity surfaces 84 along with the mechanically cooperative manner in which the upper wing member clamping jaws 48 clampably engage and hold the respective upper wing members 44 in an outwardly distended disposition prepatory to accomplishment of the first and second shoulder juncture tendon and tissue manual severing cuts 76 and 80 respectively. As noted in FIG. 6, the mandrel station truncated cone 40 conformably accommodates internal carcass section cavity surface 84 supportive insertion thereupon of said carcass section 12 from the neck opening 42 thereof downwardly to the carcass section lower torso opening 46, and any processing operation function performed downwardly thereon such as the peelable removal of joined breast fillets 14 with wings 16 thereto attached by the method hereof thereby urges the internal carcass section torso opening surfaces 84 against said cone 40 and thus serves to provide an even firmer fix of positioning of said carcass section 12 upon the truncated cone 40 as aforesaid and thereby in turn enable the control features provided by said machine 10 in accomplishing breast de-boning by the method hereof.

Figure 7:
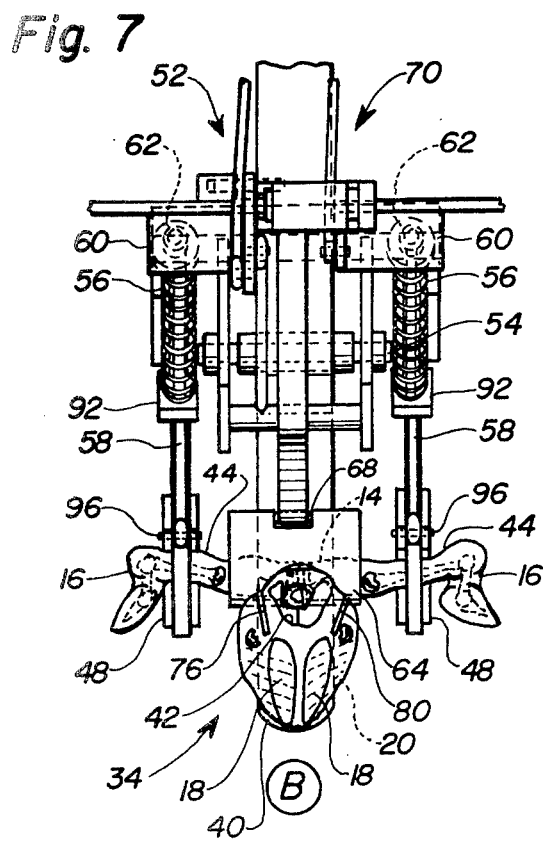
FIG. 7 is an enlarged top plan view of that de-boning machine post infeed processing intermediate station just after mechanical removal from the forward bilateral poultry carcass section of the joined breasts with wings thereto attached.
Figure 8:
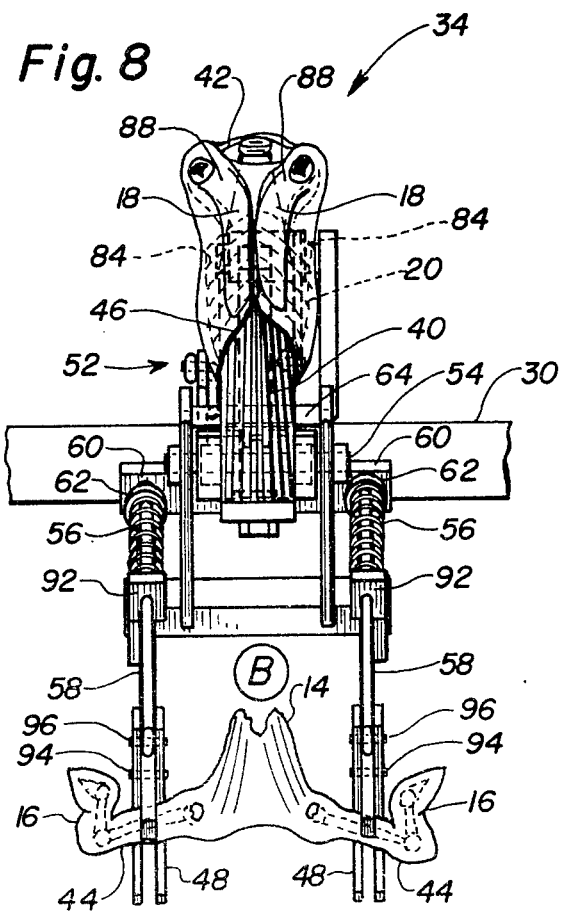
FIG. 8 is a front elevation view corresponding to that as illustrated in FIG. 7.

Considering lastly and concurrently the FIGS. 7 and 8 illustrations respectively showing an enlarged top and side elevation of the separated carcass section disposition at the breast fillet peelable stripping position "B" immediately after peelable removal of the joined breast fillets 14 with wings 16 thereto attached and just prior to the manually incised cuts to facilitate removal of the tenders 18, wherein it will be particularly noted in FIG. 8 upon a visual comparison thereof to corresponding FIG. 6 that the mandrel station 34 truncated cone 40 insertable relationship to the torso portion of the carcass section being processed, that in the FIG. 8 view, following downward peelable removal of the joined breast fillets 14 with wings 16 thereto attached the carcass section torso rib cage 20 has been further forceably impaled upon said truncated cone 40 thereby resulting in a more secure positioning retention thereon for subsequent accomplishment of manual processing removal of the tenders 18 as previously described.

Although the invention has been herein shown and described in what is conceived to be the most practical and preferred embodiment, it is recognized that departures may be made therefrom within the scope of the invention, which is not to be limited to the details specifically disclosed herein but is to be accorded the full scope of the claims so as to embrace any and all equivalent apparatus and methods.

We claim:

1. A poultry breast de-boning machine powered by an adjustable speed drive motor connectably through a gear box adapted to intercommunicate by means of a chain sprocket drive train the transmittal and imparting of variably set rotary motion from said drive motor to a turntable drive shaft to in turn impart an adjustably set rotary displacement motion speed to an elevated horizontally disposed planar turntable having assembled thereto at regularly repeating arcuately spaced radial intervals a plurality of mechanically identical processing stations respectively adapted to receive by manually fed placement and support thereupon for arcuately displaced combined step-wise accomplishment of manual and mechanical breast de-boning processing operations a succession of forward bilateral poultry carcass sections at said adjustably set rotary displacement motion speed, said machine comprising in combination:
   a. a support frame having interconnected vertical and horizontal members,
   b. an infeed station location and a delivery station location respectively positioned at opposite radially disposed ends of said planar turntable,
   c. a corresponding plurality of upward projecting truncated cone mandrel means respectively assembled one each upon outwardly projecting support means in turn respectively assembled one each at said regularly repeating arcuately spaced radial intervals of said horizontally disposed planar turntable and describing respectively said plurality of mechanically identical processing stations, and
   d. a corresponding plurality of clamping jaws respectively assembled in a one each upward and outward projecting spatially related bilateral relationship set starting position relative to said upward projecting truncated cone mandrel means and operable by a first cam means to pivotally cycle simultaneously outward and downward operationally relative to said upward projecting truncated cone mandrel means during arcuately displaced rotary transit of said elevated horizontally disposed planar turntable at said adjustably set rotary displacement motion speed from the infeed station location to the delivery station location of said machine and thereafter pivotally cycle simultaneously upward and inward to said upward and outward projecting spatially related bilateral starting position upon completed arcuately displaced rotary transit return thereof upon said elevated horizontally disposed planar turntable to said infeed station location therefor.

2. The machine according to claim 1 in which said clamping jaws are operable by a spring means normally spring-biased to a closed position.

3. The machine according to claim 2 in which said spring means is a coil spring.

4. The machine according to claim 3 in which the biasing force of said clamping jaw coil spring is provided with a spring tension adjustment means.

5. The machine according to claim 1 in which said clamping jaws and said first cam means operationally cycle respectively through an intercommunicating clamp cam follower pivotal linkage.

6. The machine according to claim 5 in which said intercommunicating clamp cam follower pivotal linkage is cycled by a first trailing cam follower.

7. The machine according to claim 1 in which a corresponding plurality of pivotal push plates are respectively assembled in a one each downward and outward projecting centrally intermediate disposition relative to said clamping jaws and operable by a second cam means to pivotally cycle pivotally upward and outward relative to said upward projecting truncated cone mandrel means during arcuately displaced rotary displacement of said elevated horizontally disposed planar turntable at said adjustably set rotary displacement motion speed from the infeed station location to the delivery station location of said machine and thereafter pivotally cycle downward and inward to said downward and outward projecting centrally intermediate disposition starting position upon completed arcuately displaced rotary transit return thereof upon said elevated horizontally disposed planar turntable to said infeed station location therefor.

8. The machine according to claim 7 in which said pivotal push plates and said second cam means operationally cycle respectively through an intercommunicating pivotal push plate cam follower pivotal linkage.

9. The machine according to claim 8 in which said intercommunicating pivotal push plate cam follower pivotal linkage is cycled by a second trailing cam follower.

10. A combined manual and mechanical step-wise method of breast de-boning forward bilateral poultry carcass sections to deliver therefrom a joined set of breast fillets with wings thereto attached substantially without bone fiber contamination thereof, said method comprising manually placing sequentially said carcass sections individually with the torso body cavity surfaces insertably supported upward and internally in close conformive communication thereof upon one of a plurality of truncated cone mandrel means during an adjustably set continually arcuate displacement mechanically driven rotational transport thereof, manually effecting simultaneous mechanical clamping by jaw means of the upper wing members of said carcass section relative thereto respectively in a torso bilateral upward and outward distended disposition, manually severing the respective upper wing member to torso joint connecting tissue and tendon membrane material, mechanically downward peeling simultaneously the joined breast fillets with wings thereto attached from the carcass section supporting skeletal structure, manually severing and removing sequentially a remaining set of tenders from the carcass section supporting skeletal structure, mechanically ejecting the remaining carcass section skeletal structure upwardly off said truncated cone mandrel means, and thereafter mechanically releasing said joined breast fillets with wings thereto attached from said jaw means.

* * * * *